United States Patent

Phelan et al.

[11] Patent Number: 6,005,236
[45] Date of Patent: Dec. 21, 1999

[54] AUTOMATIC SUN TRACKING APPARATUS

[76] Inventors: John J. Phelan, 109 Jeanette Ave., Inwood, N.Y. 11096; Joseph P. Phelan, 74 Alloway Rd., Parsippany, N.J. 07054; Richard L. Miller, 12 Parkside Dr., Dix Hills, N.Y. 11746-4879

[21] Appl. No.: 08/537,626

[22] Filed: Oct. 2, 1995

[51] Int. Cl.⁶ .................................................. G01J 1/20
[52] U.S. Cl. ........................................ 250/203.4; 126/600
[58] Field of Search ................................. 250/203.4, 204, 250/203.1, 216; 126/600, 573, 570, 571, 572; 356/141.2

[56] References Cited

U.S. PATENT DOCUMENTS

| | | | |
|---|---|---|---|
| 3,656,844 | 4/1972 | Botskor | 353/3 |
| 4,332,239 | 6/1982 | Hotine | 126/576 |
| 4,419,981 | 12/1983 | Mori | 250/203.4 |
| 4,649,900 | 3/1987 | Trihey | 126/575 |
| 4,922,088 | 5/1990 | Kasuya | 250/203.4 |
| 4,950,063 | 8/1990 | Pohle et al. | 359/430 |

*Primary Examiner*—Que Le
*Attorney, Agent, or Firm*—Richard L. Miller, P.E

[57] ABSTRACT

A sun-following solar panel stand that includes a frame, a hollow box, rotating and pivoting apparatus, first, second, and third light apparatus, comparing apparatus, and combination determining and comparing apparatus. The frame is horizontally rotatively mountable to a surface and the hollow box is vertically pivotally mounted to the frame. The rotating apparatus rotates the frame as the sun traverses horizontally and the pivoting apparatus pivots the hollow box as the sun traverses vertically. The first light apparatus provide a first light apparatus output responsive to the horizontal position of the sun. The second light apparatus provide a second light apparatus output responsive to the vertical position of the sun. The third light apparatus provide a third light apparatus output responsive to the general position of the sun. The comparing apparatus compares the first light apparatus output to the third light apparatus output and causes the rotating apparatus to seek a position where the first light apparatus output and the third light apparatus output are equal. And, the combination determining and comparing apparatus determines when the second light apparatus output is a maximum and compares the maximum second light apparatus output to the third light apparatus output and causes the pivoting apparatus to seek a position where the maximum second light apparatus output and the third light apparatus output are equal.

49 Claims, 2 Drawing Sheets

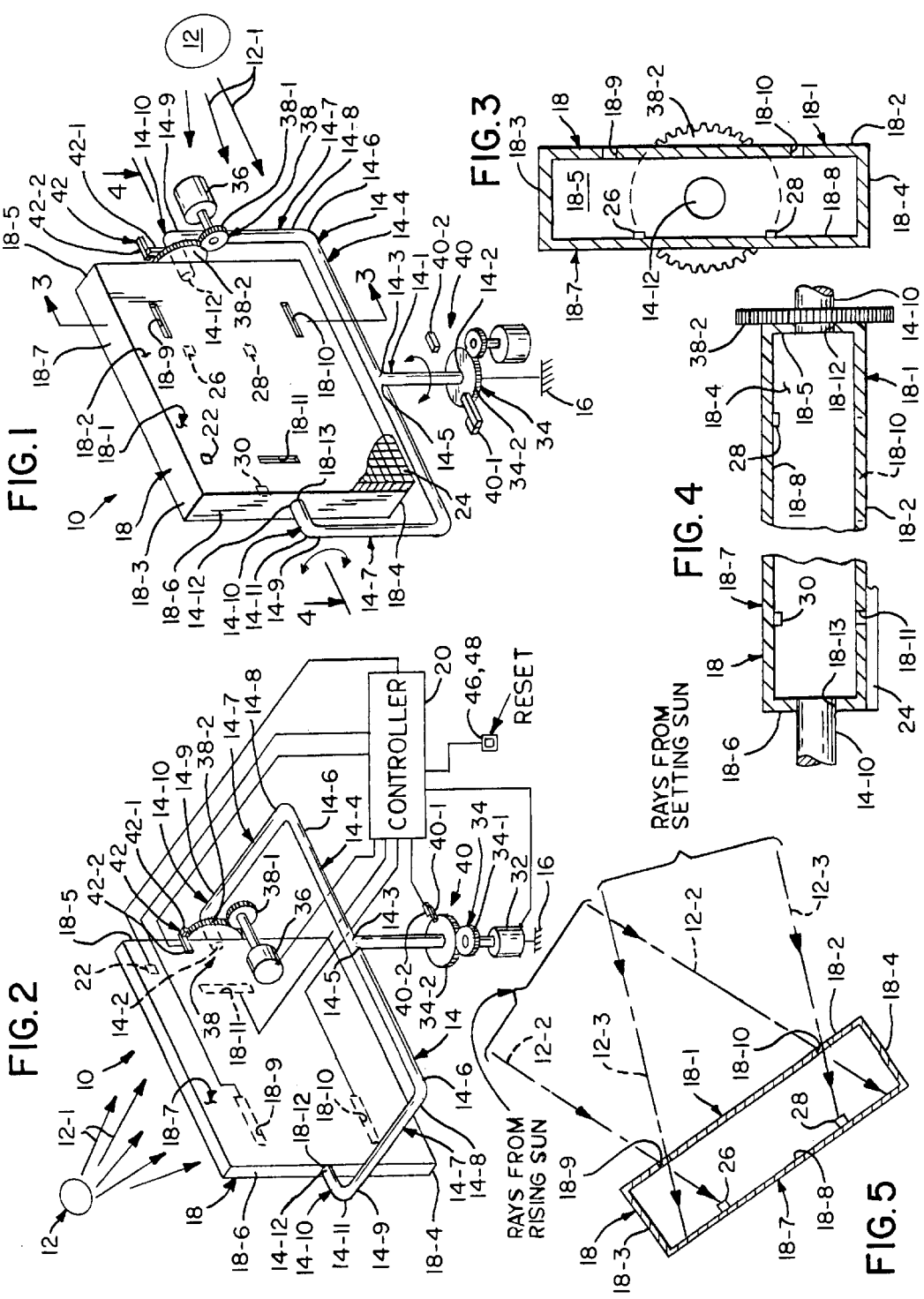

AUTOMATIC SUN TRACKING APPARATUS

BACKGROUND OF THE INVENTION

The present invention relates to a sun-following solar panel stand. More particularly, the present invention relates to a sun-following solar panel stand that includes a frame horizontally rotatively mountable to a surface, a hollow box vertically pivotally mounted to the frame that contains a horizontally oriented rising slot with a vertical rising light sensor disposed therebehind, a horizontally oriented falling slot with a vertical falling light sensor disposed therebehind, a vertically oriented slot with a horizontal light sensor disposed therebehind, a main light sensor disposed on the front surface of the hollow box, and apparatus for comparing the outputs of the main light sensor, the vertical rising light sensor, the vertical falling light sensor, and the horizontal light sensor.

The sun has always been a source of energy. Science has discovered ways of harnessing solar energy and converting it into electrical power by the use of solar cells.

In order to maximize the electrical power output from such cells, however, the available solar energy must be maximized. The maximum available solar energy would come from those solar rays that strike the solar cells normally.

Since the sun rises and sets vertically as it traverses horizontally, the effects of its solar rays would constantly change at different locations in the world. Thus, the impact of the solar rays on the solar cells would constantly change.

Numerous innovations for sun following devices have been provided in the prior art that will be described. However, even though these innovations may be suitable for the specific individual purposes to which they address, they differ from the present invention in that they do not teach a sun-following solar panel stand that includes a frame horizontally rotatively mountable to a surface, a hollow box vertically pivotally mounted to the frame and that contains a horizontally oriented rising slot with a vertical rising light sensor disposed therebehind, a horizontally oriented falling slot with a vertical falling light sensor disposed therebehind, a vertically oriented slot with a horizontal light sensor disposed therebehind, a main light sensor disposed on the front surface of the hollow box, and apparatus for comparing the outputs of the main light sensor, the vertical rising light sensor, the vertical falling light sensor, and the horizontal light sensor.

For example, U.S. Pat. No. 3,656,844 to Botskor teaches a sun following device that includes a heliostat that has an axle parallel to the earth's axis which is driven once every 48 hours. The axle has two oppositely disposed mirrors mounted thereon to each reflect the sun's light on alternate days. The mirrors are automatically adjusted to compensate for the declination of the sun by means of gears and a cam driven by the rotation of the axle.

Another example, U.S. Pat. No. 4,332,239 to Hotine teaches a sun powered automatic sun following reflector that includes a combined heat sensor and thrust motor in the form of a sealed expandable metal bellows. The sealed expandable metal bellows is disposed in the focal plane of a spherical reflector to one side of a fixed heat exchanger. The fixed heat exchanger is placed at the axial focal point of the reflector and supports the heat sensor and thrust motor to rotate with the reflector.

Still another example, U.S. Pat. No. 4,649,900 to Trihey teaches a solar energy conversion apparatus that includes a reflective parabolic trough which tracks the sun. The control means causes the trough to rotate about a north-south axis alternately to east and west extreme positions until the driving motor is disabled by equal irradiation by a pair of photo-transistors.

Finally, yet another example, U.S. Pat. No. 4,950,063 to Pohle et al. teaches an optical phased array system that uses three methods of phased array re-targeting. The first being optical re-targeting, the second being element slew, and the third being rigid body array slew. The three methods work together in hierarchical fashion to reduce the re-targeting disturbances and enhance system performance by shortening re-targeting time-lines.

It is apparent that numerous innovations for sun following devices have been provided in the prior art that are adapted to be used. Furthermore, even though these innovations may be suitable for the specific individual purposes to which they address, they would not be suitable for the purposes of the present invention as heretofore described.

SUMMARY OF THE INVENTION

Accordingly, an object of the present invention is to provide a sun-following solar panel stand that avoids the disadvantages of the prior art.

Another object of the present invention is to provide a sun-following solar panel stand that is simple to use.

Still another object of the present invention is to provide a sun-following solar panel stand that allows solar photo voltaic panels to follow the sun across the sky.

Yet another object of the present invention is to provide a sun-following solar panel stand that maintains the maximum solar gain at all times by maintaining a position normal to the sun's incident rays.

Briefly stated, still yet another object of the present invention is to provide a sun-following solar panel stand that includes a frame, a hollow box, rotating and pivoting apparatus, first, second, and third light apparatus, comparing apparatus, and combination determining and comparing apparatus.

Yet still another object of the present invention is to provide a sun-following solar panel stand wherein the frame is horizontally rotatively mountable to a surface and the hollow box is vertically pivotally mounted to the frame.

Still yet another object of the present invention is to provide a sun-following solar panel stand wherein the rotating apparatus rotates the frame as the sun traverses horizontally and the pivoting apparatus pivots the hollow box as the sun traverses vertically.

Yet still another object of the present invention is to provide a sun-following solar panel stand wherein the first light apparatus provides a first light apparatus output responsive to the horizontal position of the sun.

Still yet another object of the present invention is to provide a sun-following solar panel stand wherein the second light apparatus provides a second light apparatus output responsive to the vertical position of the sun.

Yet still another object of the present invention is to provide a sun-following solar panel stand wherein the third light apparatus provides a third light apparatus output responsive to the general position of the sun.

Still yet another object of the present invention is to provide a sun-following solar panel stand wherein the comparing apparatus compares the first light apparatus output to the third light apparatus output and causes the rotating apparatus to seek a position where the first light apparatus output and the third light apparatus output are equal.

Yet still another object of the present invention is to provide a sun-following solar panel stand wherein the combination determining and comparing apparatus determines when the second light apparatus output is a maximum and compares the maximum second light apparatus output to the third light apparatus output and causes the pivoting apparatus to seek a position where the maximum second light apparatus output and the third light apparatus output are substantially equal.

Still yet another object of the present invention is to provide a sun-following solar panel stand wherein the frame has a frame vertical slender rod mounting portion with a frame vertical slender rod mounting portion lower end and a frame vertical slender rod mounting portion upper end, a frame horizontal slender rod connecting portion with a frame horizontal slender rod connecting portion center-point and a pair of frame horizontal slender rod connecting portion ends, a pair of frame slender rod connecting portions each of which having a frame slender rod connecting portion lower end and a frame slender rod connecting portion upper end, and a pair of frame horizontal slender rod pivoting portions each of which having a frame horizontal slender rod pivoting portion outer end and a frame horizontal slender rod pivoting portion inner end.

Yet still another object of the present invention is to provide a sun-following solar panel stand wherein the frame horizontal slender rod connecting portion is connected at the frame horizontal slender rod connecting portion center-point to the frame vertical slender rod mounting portion upper end and extends perpendicularly outwardly therefrom.

Still yet another object of the present invention is to provide a sun-following solar panel stand wherein each of the pair of frame slender rod connecting portions is connected at the frame slender rod connecting portion lower end to each of the pair of frame horizontal slender rod connecting portion ends and extends perpendicularly upwardly therefrom and is disposed parallel to the frame vertical shaped slender rod mounting portion.

Yet still another object of the present invention is to provide a sun-following solar panel stand wherein each of the pair of frame horizontal slender rod pivoting portions is connected at the frame horizontal slender rod pivoting portion outer end to the frame slender rod connecting portion upper end and extends perpendicularly inwardly therefrom and is disposed parallel to the frame horizontal slender rod connecting portion.

Still yet another object of the present invention is to provide a sun-following solar panel stand wherein each of the pair of frame slender rod connecting portions is connected at the frame slender rod connecting portion lower and to each of the pair of frame horizontal slender rod connecting portion ends and extends perpendicularly inwardly therefrom and is disposed perpendicular to the frame vertical slender rod mounting portion.

Yet still another object of the present invention is to provide a sun-following solar panel stand wherein each of the pair of frame horizontal slender rod pivoting portions is connected at the frame horizontal slender rod pivoting portion outer end to the frame slender rod connecting portion upper end and extends perpendicularly inwardly therefrom and is disposed parallel to the frame horizontal slender rod connecting portion.

Still yet another object of the present invention is to provide a sun-following solar panel stand wherein the frame vertical slender rod mounting portion, the frame horizontal slender rod connecting portion, the pair of frame slender rod connecting portions, and the pair of frame horizontal slender rod pivoting portions are integrally formed.

Yet still another object of the present invention is to provide a sun-following solar panel stand wherein the hollow box has a hollow box front with a hollow box front outer surface, a hollow box horizontal upper side, a hollow box horizontal lower side, a hollow box vertical right side, a hollow box vertical left side, and a hollow box back with a hollow box back inner surface.

Still yet another object of the present invention is to provide a sun-following solar panel stand wherein the second light apparatus includes a hollow box front horizontally oriented rising slot contained in the hollow box front and disposed in the area where the hollow box horizontal upper side and the hollow box vertical right side meet.

Yet still another object of the present invention is to provide a sun-following solar panel stand wherein the second light apparatus further includes a hollow box front horizontally oriented falling slot contained in the hollow box front and disposed in the area where the hollow box horizontal lower side and the hollow box vertical right side meet.

Still yet another object of the present invention is to provide a sun-following solar panel stand wherein the hollow box front horizontally oriented falling slot is parallel to the hollow box front horizontally oriented rising slot.

Yet still another object of the present invention is to provide a sun-following solar panel stand wherein the first light apparatus includes a hollow box front vertically oriented slot contained in the hollow box front and disposed between the hollow box front horizontally oriented rising slot and the hollow box front horizontally oriented falling slot in the area of the hollow box vertical left side.

Still yet another object of the present invention is to provide a sun-following solar panel stand wherein the hollow box front vertically oriented slot is disposed perpendicular to the hollow box front horizontally oriented falling slot and the hollow box front horizontally oriented rising slot.

Yet still another object of the present invention is to provide a sun-following solar panel stand wherein the length of the hollow box front vertically oriented slot is less than the space between the hollow box front horizontally oriented rising slot and the hollow box front horizontally oriented falling slot.

Still yet another object of the present invention is to provide a sun-following solar panel stand wherein the third light apparatus includes a main light sensor that produces a main light sensor output and is disposed on the hollow box front outer surface in the area where the hollow box horizontal upper side and the hollow box vertical left side meet.

Yet still another object of the present invention is to provide a sun-following solar panel stand that further includes a solar array disposed on the hollow box front outer surface.

Still yet another object of the present invention is to provide a sun-following solar panel stand wherein the hollow box vertical right side contains a centrally disposed hollow box vertical right side aperture that pivotally receives one frame horizontal slender rod pivoting portion inner end of the pair of frame horizontal slender rod pivoting portions.

Yet still another object of the present invention is to provide a sun-following solar panel stand wherein the hollow box vertical left side contains a centrally disposed hollow box vertical left side aperture that pivotally receives the other frame horizontal slender rod pivoting portion inner end of the pair of frame horizontal slender rod pivoting portions.

Still yet another object of the present invention is to provide a sun-following solar panel stand wherein the second light apparatus still further includes a vertical rising light sensor that produces a vertical rising light sensor output and is disposed on the hollow box back inner surface behind and below the hollow box front horizontally oriented rising slot.

Yet still another object of the present invention is to provide a sun-following solar panel stand wherein the second light apparatus yet further includes a vertical falling light sensor that produces a vertical falling light sensor output and is disposed on the hollow box back inner surface behind and above the hollow box front horizontally oriented falling slot.

Still yet another object of the present invention is to provide a sun-following solar panel stand wherein the vertical rising light sensor and the vertical falling light sensor are disposed between the hollow box front horizontally oriented rising slot and the hollow box front horizontally oriented falling slot.

Yet still another object of the present invention is to provide a sun-following solar panel stand wherein the first light apparatus further includes a horizontal light sensor that produces a horizontal light sensor output and is disposed on the hollow box back inner surface behind the hollow box front vertically oriented slot.

Still yet another object of the present invention is to provide a sun-following solar panel stand wherein the first light apparatus and the second light apparatus include lenses.

Yet still another object of the present invention is to provide a sun-following solar panel stand wherein one of the lenses is disposed in the hollow box front vertically oriented slot.

Still yet another object of the present invention is to provide a sun-following solar panel stand wherein another of the lenses is disposed in the hollow box horizontally oriented falling slot.

Yet still another object of the present invention is to provide a sun-following solar panel stand wherein still another of the lenses is disposed in the hollow box horizontally oriented rising slot.

Still yet another object of the present invention is to provide a sun-following solar panel stand wherein the rotating apparatus includes a horizontal servo motor adaptable to the surface and a horizontal gear train.

Yet still another object of the present invention is to provide a sun-following solar panel stand wherein the horizontal gear train includes a horizontal gear train motor gear disposed on the horizontal servo motor and a horizontal gear train frame gear disposed on the frame vertical slender rod mounting portion lower end.

Still yet another object of the present invention is to provide a sun-following solar panel stand wherein the horizontal gear train motor gear is smaller than the horizontal gear train frame gear.

Yet still another object of the present invention is to provide a sun-following solar panel stand wherein the rotating apparatus further includes a horizontal limit switch that has a horizontal cam surface disposed on the horizontal gear train frame gear and a horizontal micro switch disposed on the surface.

Still yet another object of the present invention is to provide a sun-following solar panel stand wherein the pivoting apparatus includes a vertical servo motor and a vertical gear train.

Yet still another object of the present invention is to provide a sun-following solar panel stand wherein the vertical gear train includes a vertical gear train first gear and a vertical gear train second gear.

Still yet another object of the present invention is to provide a sun-following solar panel stand wherein the vertical gear train first gear is smaller than the vertical gear train second gear.

Yet still another object of the present invention is to provide a sun-following solar panel stand wherein the pivoting apparatus further includes a vertical limit switch that has a vertical cam surface and a vertical micro switch.

Still yet another object of the present invention is to provide a sun-following solar panel stand wherein the vertical servo motor is disposed on the frame.

Yet still another object of the present invention is to provide a sun-following solar panel stand wherein the vertical gear train first gear is disposed on the vertical servo motor and the vertical gear train second gear is disposed on the hollow box vertical right side.

Still yet another object of the present invention is to provide a sun-following solar panel stand wherein the vertical cam surface is disposed on the vertical gear train second gear and the vertical micro switch is disposed on the frame.

Yet still another object of the present invention is to provide a sun-following solar panel stand wherein the vertical servo motor is disposed on the hollow box back.

Still yet another object of the present invention is to provide a sun-following solar panel stand wherein the vertical gear train first gear is disposed on the vertical servo motor and the vertical gear train second gear is disposed on the frame.

Yet still another object of the present invention is to provide a sun-following solar panel stand wherein the vertical cam surface is disposed on the hollow box back and the vertical micro switch is disposed on the vertical gear train second gear.

Still yet another object of the present invention is to provide a sun-following solar panel stand that still further includes a controller that has a horizontal relay with horizontal relay tracking contacts and horizontal relay resetting contacts, a vertical position comparator switch arrangement with a vertical position switch and a vertical position comparator, a vertical servo motor polarity switch, a vertical servo motor amplifier, a vertical maximizing comparator, a horizontal maximizing comparator, and a horizontal servo motor amplifier.

Yet still another object of the present invention is to provide a sun-following solar panel stand wherein the vertical falling light sensor output and the vertical rising light sensor output are compared by the vertical position comparator to determine which is greater.

Still yet another object of the present invention is to provide a sun-following solar panel stand wherein the greater of the vertical falling light sensor output and the vertical rising light sensor output causes the vertical position switch to change polarity of the vertical servo motor to correspond to the desired direction of pivoting of the hollow box.

Yet still another object of the present invention is to provide a sun-following solar panel stand wherein the main light sensor output and the greater of the vertical falling light sensor output and the vertical rising light sensor output are compared by the vertical comparator so as to provide optimum vertical tracking of the sun-following solar panel device.

Still yet another object of the present invention is to provide a sun-following solar panel stand wherein the horizontal light sensor output and the main light sensor output are compared by the horizontal comparator so as to provide optimum horizontal tracking of the sun-following solar panel device.

Yet still another object of the present invention is to provide a sun-following solar panel stand that yet further includes a vertical push-button momentary reset switch and a vertical push-button momentary reset switch disposed in the controller.

Finally, still yet another object of the present invention is to provide a method of using a sun-following solar panel stand that includes the steps of initializing the sun-following solar panel stand in the horizontal tracking mode and the vertical tracking mode, initializing a hollow box of the sun-following solar panel stand in the vertical home position and a frame of the sun-following solar panel stand in the horizontal home position, closing contacts of a vertical limit switch of the sun-following solar panel stand automatically and simultaneously with the second initializing step, opening contacts of a horizontal limit switch of the sun-following solar panel stand automatically and simultaneously with the closing step, passing sun rays of the sun simultaneously through a hollow box front horizontally oriented rising slot, a hollow box front horizontally oriented falling slot, and a hollow box front vertically oriented slot of the sun-following solar panel stand as the sun traverses, impacting the sun rays simultaneously on a horizontal light sensor, a vertical rising light sensor, a vertical falling light sensor, and a maim light sensor of the sun-following solar panel stand, comparing automatically outputs of the vertical rising light sensor and the vertical falling light sensor by a vertical position comparator of the sun-following solar panel stand, determining the greater of the outputs of the vertical rising light sensor and the vertical falling light sensor automatically and simultaneously with the comparing step, causing a vertical position switch of the sun-following solar panel stand to cause a vertical servo motor polarity switch of the sun-following solar panel stand to change the polarity of a vertical servo motor of the sun-following solar panel stand automatically and simultaneously with the determining step, comparing the greater of the outputs of the vertical rising light sensor and the vertical falling light sensor with an output of the main light sensor by a vertical comparator of the sun-following solar panel stand, comparing an output of the horizontal light sensor with the output of the main light sensor by a horizontal comparator of the sun-following solar panel stand automatically and simultaneously with the second comparing step, opening the contacts of the vertical limit switch automatically and simultaneously with the third comparing step while the sun traverses, closing the contacts of the horizontal limit switch automatically and simultaneously with the second opening step as the sun traverses, repeating until the sun sets, putting the sun following solar panel stand in the horizontal resetting mode automatically when the sun sets, closing the contacts of the vertical limit switch automatically and simultaneously with the putting step, energizing a horizontal relay of the sun-following solar panel stand automatically and simultaneously with the third closing step, putting the sun-following solar panel stand in the resetting mode automatically and simultaneously with the energizing step, rotating the sun-following solar panel stand in the resetting mode until the sun-following solar panel stand reaches the horizontal home position, opening the contacts of the horizontal limit switch when the sun-following solar panel stand reaches the horizontal home position, deactivating the resetting mode automatically and simultaneously with the third opening step, and activating said tracking mode automatically and simultaneously with said deactivating step.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic front perspective view of the instant invention;

FIG. 2 is a diagrammatic rear perspective view of an alternate embodiment of the instant invention;

FIG. 3 is a cross sectional view, with some parts broken away, taken along line 3—3 of FIG. 1;

FIG. 4 is a cross sectional view, with some parts broken away, taken along line 4—4 of FIG. 1;

FIG. 5 is a view illustrating a portion of the instant invention tracking the sun azimuth with the error angle greatly exaggerated for the purpose of explanation.

Figure 6:
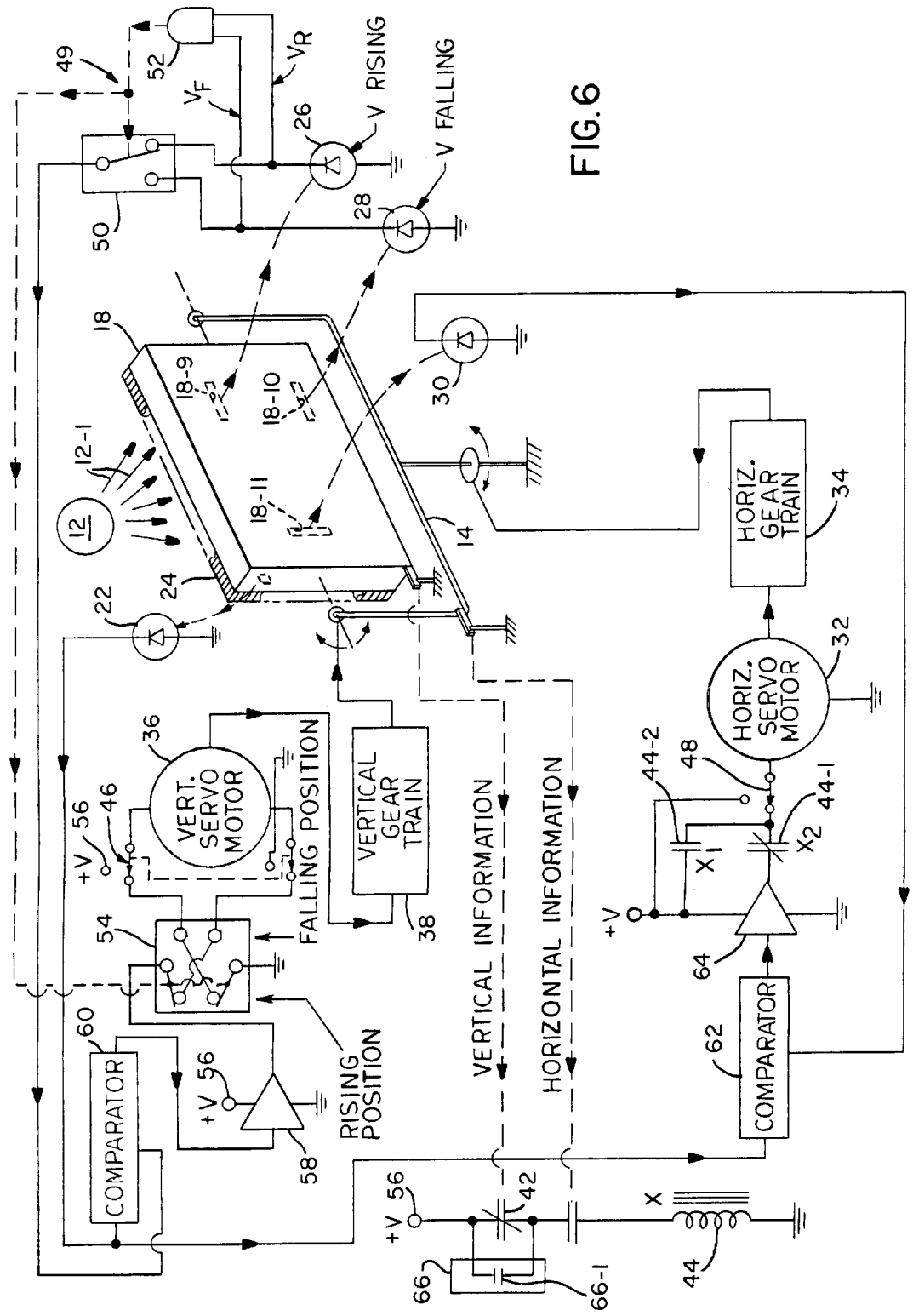
FIG. 6 is a block diagram illustrating the instant invention.

LIST OF REFERENCE NUMERALS UTILIZED IN THE DRAWING 10 sun-following solar panel stand of the present invention
12 sun
12-1 sun rays
14 frame
14-1 frame vertical slender rod mounting portion
14-2 frame vertical slender rod mounting portion lower end
14-3 frame vertical slender rod mounting portion upper end
14-4 frame horizontal slender rod connecting portion
14-5 frame horizontal slender rod connecting portion centerpoint
14-6 pair of frame horizontal slender rod connecting portion ends
14-7 pair of frame slender rod connecting portions
14-8 frame slender rod connecting portion lower end
14-9 frame slender rod connecting portion upper end
14-10 pair of frame horizontal slender rod pivoting portions
14-11 frame horizontal slender rod pivoting portion outer end
14-12 frame horizontal slender rod pivoting portion inner end
16 surface
18 hollow box
18-1 hollow box front
18-2 hollow box front outer surface
18-3 hollow box horizontal upper side
18-4 hollow box horizontal lower side
18-5 hollow box vertical right side
18-6 hollow box vertical left side
18-7 hollow box back
18-8 hollow box back inner surface
18-9 hollow box front horizontally oriented rising slot
18-10 hollow box front horizontally oriented falling slot
18-11 hollow box front vertically oriented slot 18-12 centrally disposed hollow box vertical right side aperture
18-13 centrally disposed hollow box vertical left side aperture
20 controller
22 main light sensor
24 solar array
26 vertical rising light sensor
28 vertical falling light sensor
30 horizontal light sensor
32 horizontal servo motor
34 horizontal gear train
34-1 horizontal gear train motor gear
34-2 horizontal gear train frame gear
36 vertical servo motor
38 vertical gear train
38-1 vertical gear train first gear
38-2 vertical gear train second gear
40 horizontal limit switch
40-1 horizontal cam surface
40-2 horizontal micro switch
42 vertical limit switch
42-1 vertical cam surface
42-2 vertical micro switch
44 horizontal relay
44-1 horizontal relay tracking contacts
44-2 horizontal relay resetting contacts
46 vertical push-button momentary reset switch
48 horizontal push-button momentary reset switch
49 vertical position comparator switch arrangement
50 vertical position switch
52 vertical position comparator
54 vertical servo motor polarity switch
56 power source
58 vertical servo motor amplifier
60 vertical maximizing comparator
62 horizontal maximizing comparator
64 horizontal servo motor amplifier

DETAILED DESCRIPTION OF THE PREFERRED EMBODIMENT

Referring now to the figures in which like numerals indicate like parts, and particularly to FIGS. 1 and 2, the sun-following solar panel stand of the present invention is shown generally at 10 impinged by sun rays 12-1 of sun 12.

The configuration of the sun-following solar panel stand 10 can best be seen in FIGS. 1–4, and as such, will be discussed with reference thereto.

The sun-following solar panel stand 10 includes a frame 14 horizontally rotatively mounted to a surface 16, a hollow box 18 vertically pivotally mounted to the frame 14, and a controller 20 for controlling among other things; the horizontal rotating of the frame 14; and the vertical pivoting of the hollow box 18.

The frame 14 has a frame vertical slender rod mounting portion 14-1 with a frame vertical slender rod mounting portion lower end 14-2 and a frame vertical slender rod mounting portion upper end 14-3, a frame horizontal slender rod connecting portion 14-4 with a frame horizontal slender rod connecting portion center-point 14-5 and a pair of frame horizontal slender rod connecting portion ends 14-6, a pair of frame slender rod connecting portions 14-7 each of which having a frame slender rod connecting portion lower end 14-8 and a frame slender rod connecting portion upper end 14-9, and a pair of frame horizontal slender rod pivoting portions 14-10 each of which having a frame horizontal slender rod pivoting portion outer end 14-11 and a frame horizontal slender rod pivoting portion inner end 14-12.

The configuration of the frame 14 of the preferred embodiment can best be seen in FIG. 1, and as such, will be discussed with reference thereto.

The frame horizontal slender rod connecting portion 14-4 is connected at the frame horizontal slender rod connecting portion center-point 14-5 to the frame vertical slender rod mounting portion upper end 14-3 and extends perpendicularly outwardly therefrom.

Each of the pair of frame slender rod connecting portions 14-7 is connected at the frame slender rod connecting portion lower end 14-8 to each of the pair of frame horizontal slender rod connecting portion ends 14-6 and extends perpendicularly upwardly therefrom and is disposed parallel to the frame vertical slender rod mounting portion 14-1.

Each of the pair of frame horizontal slender rod pivoting portions 14-10 is connected at the frame horizontal slender rod pivoting portion outer end 14-11 to the frame slender rod connecting portion upper end 14-9 and extends perpendicularly inwardly therefrom and is disposed parallel to the frame horizontal slender rod connecting portion 14-4.

The configuration of an alternate embodiment of the frame 14 can best be seen in FIG. 2, and as such, will be discussed with reference thereto.

The frame horizontal slender rod connecting portion 14-4 is connected at the frame horizontal slender rod connecting portion center-point 14-5 to the frame vertical slender rod mounting portion upper end 14-3 and extends perpendicularly outwardly therefrom.

Each of the pair of frame slender rod connecting portions 14-7 is connected at the frame slender rod connecting portion lower end 14-8 to each of the pair of frame horizontal slender rod connecting portion ends 14-6 and extends perpendicularly inwardly therefrom and is disposed perpendicular to the frame vertical slender rod mounting portion 14-1.

Each of the pair of frame horizontal slender rod pivoting portions 14-10 is connected at the frame horizontal slender rod pivoting portion outer end 14-11 to the frame slender rod connecting portion upper end 14-9 and extends perpendicularly inwardly therefrom and is disposed parallel to the frame horizontal slender rod connecting portion 14-4.

The frame vertical slender rod mounting portion 14-1, the frame horizontal slender rod connecting portion 14-4, the pair of frame slender rod connecting portions 14-7, and the pair of frame horizontal slender rod pivoting portions 14-10 may be integrally formed, but is not limited to that.

The hollow box 18 has a hollow box front 18-1 with a hollow box front outer surface 18-2, a hollow box horizontal upper side 18-3, a hollow box horizontal lower side 18-4, a hollow box vertical right side 18-5, a hollow box vertical left side 18-6, and a hollow box back 18-7 with a hollow box back inner surface 18-8.

The hollow box front contains a hollow box front horizontally oriented rising slot 18-9 that is disposed in the area where the hollow box horizontal upper side 18-3 and the hollow box vertical right side 18-5 meet.

The hollow box front further contains a hollow box front horizontally oriented falling slot 18-10 that is disposed in the area where the hollow box horizontal lower side 18-4 and the hollow box vertical right side 18-5 meet. The hollow box front horizontally oriented falling slot 18-10 is parallel to the hollow box front horizontally oriented rising slot 18-9.

The hollow box front still further contains a hollow box front vertically oriented slot 18-11 that is disposed intermediate the hollow box front horizontally oriented rising slot 18-9 and the hollow box front horizontally oriented falling slot 18-10 and in the area of the hollow box vertical left side 18-6. The hollow box front vertically oriented slot 18-11 is disposed perpendicular to the hollow box front horizontally oriented falling slot 18-10 and the hollow box front horizontally oriented rising slot 18-9.

A main light sensor 22 is disposed on the hollow box front outer surface 18-2 in the area where the hollow box horizontal upper side 18-3 and the hollow box vertical left side 18-6 meet, but is not limited to that location.

A solar array 24 covers the hollow box front outer surface 18-2 except in the areas of the hollow box front horizontally oriented rising slot 18-9, the hollow box front horizontally oriented falling slot 18-10, the hollow box front vertically oriented slot 18-11, and the main light sensor 22.

The hollow box vertical right side 18-5 contains a centrally disposed hollow box vertical right side aperture 18-12 that pivotally receives one frame horizontal slender rod pivoting portion inner end 14-12 of the pair of frame horizontal slender rod pivoting portions 14-10.

The hollow box vertical left side 18-6 contains a centrally disposed hollow box vertical left side aperture 18-13 that pivotally receives the other frame horizontal slender rod pivoting portion inner end 14-12 of the pair of frame horizontal slender rod pivoting portions 14-10.

The ability of one frame horizontal slender rod pivoting portion inner end 14-12 to be pivotally received by the centrally disposed hollow box vertical right side aperture 18-12 and the ability of the other frame horizontal slender rod pivoting portion inner end 14-12 to be pivotally received by the centrally disposed hollow box vertical left side aperture 18-13 allow the hollow box 18 to vertically pivot relative to the frame 14 and track the sun 12 during its rising and falling.

A vertical rising light sensor 26 is disposed on the hollow box back inner surface 18-8 behind and slightly below (but exaggerated in FIG. 5) the hollow box front horizontally oriented rising slot 18-9.

A vertical falling light sensor 28 is disposed on the hollow box back inner surface 18-8 behind and slightly above (but exaggerated in FIG. 5) the hollow box front horizontally oriented falling slot 18-10.

With this configuration, both the vertical rising light sensor 26 and the vertical falling light sensor 28 are disposed on the hollow box back inner surface 18-8 between the hollow box front horizontally oriented rising slot 18-9 and the hollow box front horizontally oriented falling slot 18-10.

A horizontal light sensor 30 is disposed on the hollow box back inner surface 18-8 directly behind the hollow box front vertically-shaped slot 18-11.

The specific configuration and positioning of the hollow box front horizontally oriented rising slot 18-9, the hollow box front horizontally oriented falling slot 18-10, and the hollow box front vertically oriented slot 18-11, and the specific positioning of the vertical rising light sensor 26, the vertical falling light sensor 28, and the horizontal light sensor 30 relative to the hollow box front horizontally oriented rising slot 18-9, the hollow box front horizontally oriented falling slot 18-10, and the hollow box front vertically oriented slot 18-11 allow for the proper vertical and horizontal tracking of the sun 12.

In order to increase the resolution of the sun-following solar panel stand 10 and also to protect the vertical rising light sensor 26, the vertical falling light sensor 28, and the horizontal light sensor 30 and to focus the sun rays 12-1 impinging them, lenses (not shown) can optionally be provided in the hollow box front horizontally oriented rising slot 18-9, the hollow box front horizontally oriented falling slot 18-10, and the hollow box front vertically oriented slot 18-11.

In order to increase the resolution of the sun-following solar panel stand 10 and also to protect the main light sensor 22, and to focus the sun rays 12-1 impinging it, a lens (not shown) can optionally be provided thereon.

A horizontal servo motor 32 and a horizontal gear train 34 provide horizontal rotation of the frame 18 allowing for tracking of the sun 12 horizontally while a concurrently operating vertical servo motor 36 and a vertical gear train 38 provide vertical pivoting of the hollow box 18 allowing for tracking of the sun 12 as it rises and sets.

The horizontal servo motor 32 is affixed to the surface 16 and communicates with the frame vertical slender rod mounting portion lower end 14-2 by way of the horizontal gear train 34. The horizontal gear train 34 typically but not limited to includes a horizontal gear train motor gear 34-1 affixed to the horizontal servo motor 32, and a horizontal gear train frame gear 34-2 affixed to the frame vertical slender rod mounting portion lower end 14-2 which meshes with the horizontal gear train motor gear 34-1. The horizontal gear train motor gear 34-1 is smaller than the horizontal gear train frame gear 34-2 so that more accurate instantaneous positioning control can be achieved. As a practically matter the gear train may actually consist of several gears as well and dictated by the mathematics for making the system stable.

A horizontal limit switch 40 includes a horizontal cam surface 40-1 disposed on the horizontal gear train frame gear 34-2 and a horizontal micro switch 40-2 disposed on the surface 16.

The positioning of the vertical servo motor 36 and the vertical gear train 38 of the preferred embodiment can best be seen in FIG. 1, and as such, will be discussed with reference thereto.

The vertical servo motor 36 is affixed to the frame 14 and communicates with the hollow box 18 by way of the vertical gear train 38. The vertical gear train 38 includes a vertical gear train first gear 38-1 affixed to the vertical servo motor 36, and a vertical gear train second gear 38-2 affixed to the hollow box vertical right side 18-5 which meshes with the vertical gear train first gear 38-1. The vertical gear train first gear 38-1 is smaller than the vertical gear train second gear 38-2 so that more accurate instantaneous positioning control can be achieved.

A vertical limit switch 42 includes a vertical cam surface 42-1 disposed on the vertical gear train second gear 38-2 and a vertical micro switch 42-2 disposed on the frame 14.

The positioning of the vertical servo motor 36 and the vertical gear train 38 of an alternate embodiment can best be seen in FIG. 2, and as such, will be discussed with reference thereto.

The vertical servo motor 36 is affixed to the hollow box back 18-7 and communicates with the frame 14 by way of the vertical gear train 38. The vertical gear train 38 includes the vertical gear train first gear 38-1 which is affixed to the vertical servo motor 36, and the vertical gear train second gear 38-2 which is affixed to the one of the pair of frame horizontal slender rod pivoting portions 14-10 that is pivotally connected to the hollow box vertical left side 18-6 and which meshes with the vertical gear train first gear 38-1.

The vertical micro switch 42-1 is disposed on the vertical gear train second gear 38-2 and the vertical cam surface 42-2 is disposed on the hollow box 18.

Due to the specific positioning of the vertical rising light sensor 26 and the vertical falling light sensor 28 relative to the hollow box front horizontally oriented rising slot 18-9 and the hollow box front horizontally oriented falling slot 18-10, which is shown in FIG. 5 greatly exaggerated for explanation purposes only, as the sun rises the sun rising rays 12-2 will pass through both the hollow box front horizontally oriented rising slot 18-9 and the hollow box front horizontally oriented falling slot 18-10 impinging greater on the vertical rising light sensor 26 than on the vertical falling light sensor 28. However, as the sun sets the sun setting rays 12-3 will pass through both the hollow box front horizontally oriented rising slot 18-9 and the hollow box front horizontally oriented falling slot 18-10 impinging greater on the vertical falling light sensor 28 than on the vertical rising light sensor 26.

The operation of the sun-following solar panel stand 10 can best be seen in FIG. 6, and as such, will be discussed with reference thereto.

The controller 20 includes at least a horizontal relay 44 with horizontal relay tracking contacts 44-1 and horizontal relay resetting contacts 44-2, a vertical push-button momentary reset switch 46, a horizontal push-button momentary reset switch 48, a vertical position comparator switch arrangement 49 with a vertical position switch 50 and a vertical position comparator 52, a vertical servo motor polarity switch 54, a power source 56, a vertical servo motor amplifier 58, a vertical maximizing comparator 60, a horizontal maximizing comparator 62, and a horizontal servo motor amplifier 64.

The sun-following solar panel stand 10 rotates horizontally in either a horizontal tracking mode or a horizontal resetting mode and pivots vertically only in a vertical tracking mode. The horizontal mode is determined by the conditions of the horizontal relay tracking contacts 44-i and the horizontal relay resetting contacts 44-2.

In the horizontal tracking mode, either the horizontal limit switch 40 or the vertical limit switch 42 are open preventing the horizontal relay 44 from being energized by the power source 56. When the horizontal relay 44 is not energized, the horizontal relay tracking contacts 44-1 are closed and the horizontal relay resetting contacts 44-2 are open.

In the horizontal resetting mode, however, both the horizontal limit switch 40 and the vertical limit switch 42 are closed causing the horizontal relay 44 to be energized by the power source 56. When the horizontal relay 44 is energized, the horizontal relay tracking contacts 44-1 are opened and the horizontal relay resetting contacts 44-2 are closed.

Initially, the sun following solar panel stand 10 is in the horizontal tracking mode and the vertical tracking mode. The hollow box 18 is positioned in the vertical home position and the frame 14 is positioned in the horizontal home position. The initialization can be accomplished either manually or by the use of the vertical push-button momentary reset switch 46 and the horizontal push-button momentary reset switch 48. The vertical push-button momentary reset switch 46 and the horizontal push-button momentary reset switch 48 can also be used to bypass the tracking mode for reset or repairs.

In the vertical home position the vertical limit switch 42 is closed but is open at all other times and in the horizontal home position the horizontal limit switch 40 is open but is closed at all other times. In the vertical and horizontal home positions, the tracking mode is operational and the resetting mode is not.

The sun rays 12-1 simultaneously pass through the hollow box front horizontally oriented rising slot 18-9, the hollow box front horizontally oriented falling slot 18-10, and the hollow box front vertically oriented slot 18-11 and impinge on the horizontal light sensor 30, the vertical rising light sensor 26, and the vertical falling light sensor 28.

In order for the hollow box 18 to track the sun 12 as it rises and falls, the vertical servo motor 36 must change its direction of rotation accordingly. This is accomplished by changing its polarity.

The outputs from the vertical rising light sensor 26 and the vertical falling light sensor 28 are feed into the vertical position comparator switch arrangement 49. The outputs from the vertical rising light sensor 26 and the vertical falling light sensor 28 are compared by the vertical position comparator 52 to determine which is greater. Once the vertical position comparator 52 has determined which is greater, the vertical position switch 50 causes the vertical servo motor polarity switch 54 to change the polarity of the vertical servo motor 36 to correspond to the desired direction of rotation. The vertical servo motor 36 is powered by current from the power source 56 which is amplified by the vertical servo motor amplifier 58.

When the output from the vertical position comparator 52 indicates that the output from the vertical rising light sensor 26 is greater than that of the vertical falling light sensor 28 the polarity of the vertical servo motor 36 will be changed so as to allow the hollow box 18 to pivot upwardly as the sun rises. However, when the output from the vertical position comparator 52 indicates that the output from the vertical falling light sensor 28 is greater than that of the vertical rising light sensor 26 the polarity of the vertical servo motor 36 will be changed so as to allow the hollow box 18 to pivot downwardly as the sun sets.

The vertical servo motor 36 continues to run in the desired direction seeking a maximum normal incidence of the sun rays 12-1 on the solar array 24. The vertical comparator 60 compares the output from the vertical position comparator switch arrangement 49 with that of the main light sensor 22 so as to allow the hollow box 18 to vertically follow and "ZERO IN" on the maximum incidence of the sun rays 12-1.

In order for the sun-following solar panel stand 10 to seek a maximum incidence of the sun rays 12-1 on the solar array 24 as the sun 12 traverses horizontally, the horizontal comparator 62 compares the output from the horizontal light sensor 30 with that of the main light sensor 22 so as to allow the hollow box 18 to horizontally follow and "ZERO IN" on the maximum incidence of the sun rays 12-1. The horizontal servo motor 32 is powered by the power source 56 which is amplified by the horizontal servo motor amplifier 64.

When the sun 12 sets, the hollow box 18 is in the vertical home position and the frame 18 is not in the horizontal home position. In this location, the horizontal limit switch 40 and the vertical limit switch 42 are closed causing the horizontal relay 44 to become energized. When the horizontal relay 44 becomes energized, the horizontal relay tracking contacts 44-1 open and the horizontal relay resetting contacts 44-2 close, activating the resetting mode and deactivating the tracking mode.

The frame 14 will continue to rotate in the resetting mode until it reaches the horizontal home position where the horizontal limit switch 40 will open and de-energize the horizontal relay 44. With the horizontal relay 44 de-energized, the horizontal relay tracking contacts 44-1 close and the horizontal relay resetting contacts 44-2 open deactivating the resetting mode and again activating the tracking mode so that the sun following solar box stand 10 is now ready for tracking the next sun rises.

In the case of a substantial cloud cover, the frame 14 will cease to rotate. A timer 66 may be optionally employed to close timer contacts 66-1 for a short period of time typically at midnight or obviously at a known time when there is not any sunlight. The contacts 66-1 should be closed slightly longer than the time required for the instant invention to complete one full horizontal revolution, when the frame reaches the horizontal home position, horizontal limit switch 40 opens causing the sun-following solar panel stand 10 to default to the tracking mode. As long as the present invention is reset to the horizontal home position the vertical tracking will be automatically initiated during the next sunrise.

When the sun-following solar panel stand 10 is in the vertical and horizontal tracking modes, and no sun rays 12-1 are present, for example, when the sun 12 is behind clouds, the main light sensor 22 will deactivate the vertical servo motor 36 and the horizontal servo motor 32 and reactivate them when the sun 12 again appears.

It should be realized that FIG. 6 is a greatly over simplified diagram and that in actual practice this device might well be designed utilizing a similar logic scheme employing modulated AC carrier signal instead of DC signals as well known in the art.

It will be understood that each of the elements described above, or two or more together, may also find a useful application in other types of constructions differing from the types described above.

While the invention has been illustrated and described as embodied in a sun-following solar panel stand, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A sun-following solar panel stand, comprising:
   a) a frame rotatively mountable to a surface for horizontal rotation thereon;
   b) a hollow box pivotally mounted to said frame for vertical pivoting thereon;
   c) rotating means for horizontally rotating said frame relative to said surface for following the sun as it traverses horizontally;
   d) pivoting means for vertically pivoting said hollow box relative to said frame for following the sun as it traverses vertically;
   e) first light means for providing a first light means output responsive to the horizontal position of the sun;
   f) second light means for providing a second light means output responsive to the vertical position of the sun;
   g) third light means for providing a third light means output responsive to the general position of the sun;
   h) comparing means for comparing said first light means output to said third light means output and causing said rotating means to seek a position where said first light means output and said third light means output are equal; and
   i) determining and comparing means for determining when said second light means output is a maximum and comparing said maximum second light means output to said third light means output and causing said pivoting means to seek a position where said maximum second light means output and said third light means output are equal.

2. The stand as defined in claim 1, wherein said frame has a frame vertical slender rod mounting portion with a frame vertical slender rod mounting portion lower end and a frame vertical slender rod mounting portion upper end, a frame horizontal slender rod connecting portion with a frame horizontal slender rod connecting portion center-point and a pair of frame horizontal slender rod connecting portion ends, a pair of frame slender rod connecting portions each of which having a frame slender rod connecting portion lower end and a frame slender rod connecting portion upper end, and a pair of frame horizontal slender rod pivoting portions each of which having a frame horizontal slender rod pivoting portion outer end and a frame horizontal slender rod pivoting portion inner end.

3. The stand as defined in claim 2, wherein said frame horizontal slender rod connecting portion is connected at said frame horizontal slender rod connecting portion center-point to said frame vertical slender rod mounting portion upper end and extends perpendicularly outwardly therefrom.

4. The stand as defined in claim 3, wherein each of said pair of frame slender rod connecting portions is connected at said frame slender rod connecting portion lower end to each of said pair of frame horizontal slender rod connecting portion ends and extends perpendicularly upwardly therefrom and is disposed parallel to said frame vertical slender rod mounting portion.

5. The stand as defined in claim 4, wherein each of said pair of frame horizontal slender rod pivoting portions is connected at said frame horizontal slender rod pivoting portion outer end to said frame slender rod connecting portion upper end and extends perpendicularly inwardly therefrom and is disposed parallel to said frame horizontal slender rod connecting portion.

6. The stand as defined in claim 3, wherein each of said pair of frame slender rod connecting portions is connected at said frame slender rod connecting portion lower end to each of said pair of frame horizontal slender rod connecting portion ends and extends perpendicularly inwardly therefrom and is disposed perpendicular to said frame vertical slender rod mounting portion.

7. The stand as defined in claim 6, wherein each of said pair of frame horizontal slender rod pivoting portions is connected at said frame horizontal slender rod pivoting portion outer end to said frame slender rod connecting portion upper end and extends perpendicularly inwardly therefrom and is disposed parallel to said frame horizontal slender rod connecting portion.

8. The stand as defined in claim 2, wherein said frame vertical slender rod mounting portion, said frame horizontal slender rod connecting portion, said pair of frame slender rod connecting portions, and said pair of frame horizontal slender rod pivoting portions are integrally formed.

9. The stand as defined in claim 2, wherein said hollow box has a hollow box front with a hollow box front outer surface, a hollow box horizontal upper side, a hollow box horizontal lower side, a hollow box vertical right side, a hollow box vertical left side, and a hollow box back with a hollow box back inner surface.

10. The stand as defined in claim 9, wherein said second light means includes a hollow box front horizontally oriented rising slot contained in said hollow box front and disposed in the area where said hollow box horizontal upper side and said hollow box vertical right side meet.

11. The stand as defined in claim 10, wherein said second light means further includes a hollow box front horizontally oriented falling slot contained in said hollow box front and disposed in the area where said hollow box horizontal lower side and said hollow box vertical right side meet.

12. The stand as defined in claim 11, wherein said hollow box front horizontally oriented falling slot is parallel to said hollow box front horizontally oriented rising slot.

13. The stand as defined in claim 12, wherein said first light means includes a hollow box front vertically oriented slot contained in said hollow box front and disposed between said hollow box front horizontally oriented rising slot and said hollow box front horizontally oriented falling slot in the area of said hollow box vertical left side.

14. The stand as defined in claim 13, wherein said hollow box front vertically oriented slot is disposed perpendicular to said hollow box front horizontally oriented falling slot and said hollow box front horizontally oriented rising slot.

15. The stand as defined in claim 14, wherein the length of said hollow box front vertically oriented slot is less than the space between said hollow box front horizontally oriented rising slot and said hollow box front horizontally oriented falling slot.

16. The stand as defined in claim 15, wherein said third light means includes a main light sensor that produces a main light sensor output and is disposed on said hollow box front outer surface in the area where said hollow box horizontal upper side and said hollow box vertical left side meet.

17. The stand as defined in claim 16; further comprising a solar array disposed on said hollow box front outer surface.

18. The stand as defined in claim 17, wherein said hollow box vertical right side contains a centrally disposed hollow box vertical right side aperture that pivotally receives one frame horizontal slender rod pivoting portion inner end of said pair of frame horizontal slender rod pivoting portions.

19. The stand as defined in claim 18, wherein said hollow box vertical left side contains a centrally disposed hollow box vertical left side aperture that pivotally receives the other frame horizontal slender rod pivoting portion inner end of said pair of frame horizontal slender rod pivoting portions.

20. The stand as defined in claim 19, wherein said second light means still further includes a vertical rising light sensor that produces a vertical rising light sensor output and is disposed on said hollow box back inner surface behind and below said hollow box front horizontally oriented rising slot.

21. The stand as defined in claim 20, wherein said second light means yet further includes a vertical falling light sensor that produces a vertical falling light sensor output and is disposed on said hollow box back inner surface behind and above said hollow box front horizontally oriented falling slot.

22. The stand as defined in claim 21, wherein said vertical rising light sensor and said vertical falling light sensor are disposed between said hollow box front horizontally oriented rising slot and said hollow box front horizontally oriented falling slot.

23. The stand as defined in claim 22, wherein said first light means further includes a horizontal light sensor that produces a horizontal light sensor output and is disposed on said hollow box back inner surface behind said hollow box front vertically oriented slot.

24. The stand as defined in claim 23, wherein said first light means and said second light means include lenses.

25. The stand as defined in claim 24, wherein one of said lenses is disposed in said hollow box front vertically oriented slot.

26. The stand as defined in claim 25, wherein another of said lenses is disposed in said hollow box horizontally oriented falling slot.

27. The stand as defined in claim 26, wherein still another of said lenses is disposed in said hollow box horizontally oriented rising slot.

28. The stand as defined in claim 27, wherein said rotating means includes a horizontal servo motor adaptable to said surface and a horizontal gear train.

29. The stand as defined in claim 28, wherein said horizontal gear train includes a horizontal gear train motor gear disposed on said horizontal servo motor and a horizontal gear train frame gear disposed on said frame vertical slender rod mounting portion lower end.

30. The stand as defined in claim 29, wherein said horizontal gear train motor gear is smaller than said horizontal gear train frame gear.

31. The stand as defined in claim 30, wherein said rotating means further includes a horizontal limit switch that has a horizontal cam surface disposed on said horizontal gear train frame gear and a horizontal micro switch disposed on said surface.

32. The stand as defined in claim 31, wherein said pivoting means includes a vertical servo motor and a vertical gear train.

33. The stand as defined in claim 32, wherein said vertical gear train includes a vertical gear train first gear and a vertical gear train second gear.

34. The stand as defined in claim 33, wherein said vertical gear train first gear is smaller than said vertical gear train second gear.

35. The stand as defined in claim 34, wherein said pivoting means further includes a vertical limit switch that has a vertical cam surface and a vertical micro switch.

36. The stand as defined in claim 35, wherein said vertical servo motor is disposed on said frame.

37. The stand as defined in claim 36 wherein said vertical gear train first gear is disposed on said vertical servo motor and said vertical gear train second gear is disposed on said hollow box vertical right side.

38. The stand as defined in claim 37, wherein said vertical cam surface is disposed on said vertical gear train second gear and said vertical micro switch is disposed on said frame.

39. The stand as defined in claim 35, wherein said vertical servo motor is disposed on said hollow box back.

40. The stand as defined in claim 39 wherein said vertical gear train first gear is disposed on said vertical servo motor and said vertical gear train second gear is disposed on said frame.

41. The stand as defined in claim 40, wherein said vertical cam surface is disposed on said hollow box back and said vertical micro switch is disposed on said vertical gear train second gear.

42. The stand as defined in claim 35; further comprising a controller that includes a horizontal relay with horizontal relay tracking contacts and horizontal relay resetting contacts, a vertical position comparator switch arrangement with a vertical position switch and a vertical position comparator, a vertical servo motor polarity switch, a vertical servo motor amplifier, a vertical maximizing comparator, a horizontal maximizing comparator, and a horizontal servo motor amplifier.

43. The stand as defined in claim 42, wherein said vertical falling light sensor output and said vertical rising light sensor output are compared by said vertical position comparator to determine which is greater.

44. The stand as defined in claim 43, wherein said greater of said vertical falling light sensor output and said vertical rising light sensor output causes said vertical position switch to change polarity of said vertical servo motor to correspond to the desired direction of pivoting of said hollow box.

45. The stand as defined in claim 44, wherein said main light sensor output and said greater of said vertical falling light sensor output and said vertical rising light sensor output are compared by said vertical comparator so as to provide optimum vertical tracking of said sun-following solar panel device.

46. The stand as defined in claim 45, wherein said horizontal light sensor output and said main light sensor output are compared by said horizontal comparator so as to provide optimum horizontal tracking of said sun-following solar panel device.

47. The stand as defined in claim 46; further comprising a horizontal push-button momentary reset switch and a vertical push-button momentary reset switch disposed in said controller.

48. The stand as defined in claim 47; further comprising timer means for automatically resetting said frame to a horizontal home position.

49. A method of using a sun-following solar panel stand, comprising the steps of:

a) initializing said sun following solar panel stand in the horizontal tracking mode and the vertical tracking mode;

b) initializing a hollow box of said sun-following solar panel stand in the vertical home position and a frame of said sun-following solar panel stand in the horizontal home position;

c) closing contacts of a vertical limit switch of said sun-following solar panel stand automatically and simultaneously with said second initializing step;

d) opening contacts of a horizontal limit switch of said sun-following solar panel stand automatically and simultaneously with said closing step;

e) passing sun rays of said sun simultaneously through a hollow box front horizontally oriented rising slot, a hollow box front horizontally oriented falling slot, and a hollow box front vertically oriented slot of said sun-following solar panel stand as said sun traverses;

f) impinging said sun rays simultaneously on a horizontal light sensor, a vertical rising light sensor, a main light sensor, and a vertical falling light sensor of said sun-following solar panel stand;

g) comparing automatically outputs of said vertical rising light sensor and said vertical falling light sensor by a vertical position comparator of said sun-following solar panel stand;

h) determining the greater of said outputs of said vertical rising light sensor and said vertical falling light sensor automatically and simultaneously with said comparing step;

i) causing a vertical position switch of said sun-following solar panel stand to cause a vertical servo motor polarity switch of said sun-following solar panel stand to change the polarity of a vertical servo motor of said sun-following solar panel stand automatically and simultaneously with said determining step;

j) comparing said greater of said outputs of said vertical rising light sensor and said vertical falling light sensor with an output of said main light sensor by a vertical comparator of said sun-following solar panel stand;

k) comparing an output of said horizontal light sensor with said output of said main light sensor by a horizontal comparator of said sun-following solar panel stand automatically and simultaneously with said second comparing step;

l) opening said contacts of said vertical limit switch automatically and simultaneously with said third comparing step while said sun traverses;

m) closing said contacts of said horizontal limit switch automatically and simultaneously with said second opening step as said sun traverses;

n) repeating said steps e) through m) until said sun sets;

o) putting said sun-following solar panel stand in the horizontal resetting mode automatically when said sun sets;

p) closing said contacts of said vertical limit switch automatically and simultaneously with said putting step;

q) energizing a horizontal relay of said sun-following solar panel stand automatically and simultaneously with said third closing step;

r) putting said sun-following solar panel stand in said resetting mode automatically and simultaneously with said energizing step;

s) rotating said sun-following solar panel stand in said resetting mode until said sun-following solar panel stand reaches said horizontal home position;

t) opening said contacts of said horizontal limit switch when said sun-following solar panel stand reaches said horizontal home position;

u) deactivating said resetting mode automatically and simultaneously with said third opening step; and v) activating said tracking mode automatically and simultaneously with said deactivating step.

* * * * *